(12) United States Patent
Newman

(10) Patent No.: US 10,500,933 B2
(45) Date of Patent: Dec. 10, 2019

(54) APPARATUS AND METHOD FOR LOADING AND DEPLOYING CARGO FROM A MOTOR VEHICLE

(71) Applicant: FORD GLOBAL TECHNOLOGIES, LLC, Dearborn, MI (US)

(72) Inventor: Matthew Scott Newman, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 266 days.

(21) Appl. No.: 15/591,970

(22) Filed: May 10, 2017

(65) Prior Publication Data

US 2018/0326887 A1   Nov. 15, 2018

(51) Int. Cl.
*B60J 5/10*   (2006.01)
*B60P 1/54*   (2006.01)
*B60R 11/00*  (2006.01)
*E05F 15/00*  (2015.01)

(52) U.S. Cl.
CPC .............. *B60J 5/101* (2013.01); *B60P 1/54* (2013.01); *B60R 11/00* (2013.01); *E05F 15/00* (2013.01)

(58) Field of Classification Search
CPC ... B60J 5/101; B60P 1/54; B60R 11/00; E05F 15/00
See application file for complete search history.

(56) References Cited

U.S. PATENT DOCUMENTS

| | | | |
|---|---|---|---|
| 3,036,797 A * | 5/1962 | Domenico | B64C 1/22 244/137.1 |
| 3,561,704 A * | 2/1971 | Schulze | B64C 1/1415 244/12.3 |
| 3,677,424 A * | 7/1972 | Anderson | A61G 7/1017 414/550 |
| 3,869,168 A * | 3/1975 | Matheson | B60P 1/4421 296/56 |
| 4,440,364 A * | 4/1984 | Cone | B64C 1/24 16/282 |
| 4,566,842 A * | 1/1986 | Clarke | A61G 3/0209 414/462 |
| 4,799,849 A * | 1/1989 | Miller | B60R 5/04 296/37.1 |
| 4,858,981 A | 8/1989 | Post | |
| 5,090,580 A | 2/1992 | Nelson | |
| 5,209,435 A * | 5/1993 | Edwards | A62B 1/00 105/348 |
| 5,615,785 A | 4/1997 | Kaner | |
| 5,707,094 A * | 1/1998 | Gower | B66C 1/0218 294/188 |

(Continued)

FOREIGN PATENT DOCUMENTS

| CN | 2213089 Y | 11/1995 | |
|---|---|---|---|
| CN | 101913342 | * 12/2010 | B60R 16/02 |

OTHER PUBLICATIONS

English Machine Translation of CN2213089Y.

*Primary Examiner* — Gerald McClain
*Assistant Examiner* — Ashley K Romano
(74) *Attorney, Agent, or Firm* — Jason Rogers; Vichit Chea; King & Schickli, PLLC

(57) ABSTRACT

An apparatus for loading and deploying cargo from a motor vehicle includes a liftgate, a liftgate drive module to displace the liftgate between a closed position and an opened position, a cargo receiver carried on the liftgate and an actuator to raise and lower cargo with respect to the cargo receiver. Related methods of deploying cargo and loading cargo are also provided.

7 Claims, 17 Drawing Sheets

(56) References Cited

U.S. PATENT DOCUMENTS

| | | | | |
|---|---|---|---|---|
| 5,765,987 | A | * | 6/1998 | Zimmermann ............ B60R 5/04 414/462 |
| 5,850,928 | A | * | 12/1998 | Kahlman ................ B66C 13/22 212/285 |
| 5,865,426 | A | * | 2/1999 | Kazerooni ................ B66C 1/62 212/285 |
| 5,915,673 | A | * | 6/1999 | Kazerooni ................ B66C 1/62 212/285 |
| 6,138,991 | A | * | 10/2000 | Myers, Jr. ................ B66C 23/44 212/180 |
| 6,152,675 | A | * | 11/2000 | Compton .............. B60P 1/5495 212/299 |
| 6,334,590 | B1 | * | 1/2002 | Landry .................... B64D 1/22 244/137.1 |
| 6,386,513 | B1 | * | 5/2002 | Kazerooni ............ B66C 1/0212 212/285 |
| 6,554,252 | B2 | * | 4/2003 | Kazerooni ............... B66D 3/18 212/331 |
| 6,619,372 | B2 | * | 9/2003 | Bold ........................ B22C 9/02 164/340 |
| 6,893,203 | B2 | | 5/2005 | Anderson et al. |
| 7,287,803 | B2 | * | 10/2007 | Koneval ............ B62D 33/0273 296/106 |
| 7,717,663 | B1 | | 5/2010 | Stowers |
| 7,810,790 | B2 | | 10/2010 | Kazerooni |
| 8,292,229 | B2 | * | 10/2012 | Pancotti ................ B64C 1/1415 244/129.5 |
| 8,915,466 | B2 | * | 12/2014 | Figoureux ............... B66C 23/18 244/136 |
| 2006/0151765 | A1 | * | 7/2006 | Kazerooni ................ B60R 5/04 254/275 |

\* cited by examiner

APPARATUS AND METHOD FOR LOADING AND DEPLOYING CARGO FROM A MOTOR VEHICLE

TECHNICAL FIELD

This document relates generally to the motor vehicle equipment field and, more particularly, to an apparatus and method for loading and deploying cargo from a motor vehicle.

BACKGROUND

Oftentimes it is necessary for an individual to transport cargo in a motor vehicle that weighs more than the individual can easily handle. For example, it can be difficult for an individual to lift many of the mobility solutions for last mile commuting, assisted living or tethered assistance.

This document relates to a new and improved apparatus and method for loading and deploying cargo from a motor vehicle. More specifically, the apparatus and method utilize the power liftgate and an actuator, such as a winch or other device on the power liftgate, to load and deploy heavy cargo that is difficult to handle.

SUMMARY

In accordance with the purposes and benefits described herein, a new and improved apparatus is provided for loading and deploying cargo from a motor vehicle. That apparatus comprises a liftgate, a liftgate drive module to displace the liftgate between a closed position and an opened position, a cargo receiver carried on the liftgate and an actuator to raise and lower cargo with respect to the cargo receiver.

The cargo receiver may be connected to the liftgate by a pivot and the receiver may be displaceable between a first or cargo storing position and a second or cargo deploying position. In some embodiments the actuator may comprise a winch including a line, a line reel and a drive motor. The line may extend through the cargo receiver.

The pivot may be a pivot pin and the liftgate may include a guide. In such an embodiment the pivot pin is displaceable along the guide as the cargo receiver is displaced between the first or cargo storing position and the second or cargo deploying position.

In other embodiments the apparatus may include a receiver drive module to displace the cargo receiver between the first or cargo storing position and the second or cargo deploying position. The liftgate drive module may include a second drive motor and a controller. The receiver drive module may include a third drive motor and a second controller.

In some embodiments the apparatus may further include an extendable support connecting the actuator to the liftgate whereby the actuator may be displaced between a home position and a deployed position. That extendable support may comprise a telescoping rail system.

In accordance with an additional aspect, a method is provided for loading and deploying cargo from a motor vehicle. That method comprises the steps of (a) holding the cargo in a cargo receiver on a liftgate, (b) opening, by a liftgate drive module, the liftgate and (c) lowering, by an actuator, the cargo from the cargo receiver.

The method may further include the step of maintaining the cargo receiver in a first or cargo storing position when holding the cargo in the cargo receiver. In addition the method may include the step of displacing the cargo receiver into a second or cargo deploying position when lowering the cargo from the cargo receiver. In addition the method may include displacing, by a receiver drive module, the cargo receiver between the first or cargo storing position and the second or cargo deploying position. Further the method may include the step of using a winch as the actuator and running a line of the winch through the cargo receiver.

In accordance with yet another aspect, a method is provided for loading cargo into a motor vehicle. That method comprises the steps of: (a) raising, by an actuator, the cargo into a cargo receiver on a liftgate, (b) holding the cargo in the cargo receiver and (c) closing, by a liftgate drive module, the liftgate.

The method may further include the step of maintaining the cargo receiver in a first position or orientation when holding the cargo. Further, the method may include the step of maintaining the cargo receiver in a second position or orientation when raising the cargo.

In addition, the method may include the step of displacing, by a receiver drive module, the cargo receiver between the first position or orientation and the second position or orientation. Further, the method may include the step of using a winch as the actuator and running a line of the winch through the cargo receiver.

In the following description, there are shown and described several preferred embodiments of the apparatus and method. As it should be realized, the apparatus and method are capable of other, different embodiments and their several details are capable of modification in various, obvious aspects all without departing from the apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and method and together with the description serve to explain certain principles thereof.

Figure 6A:
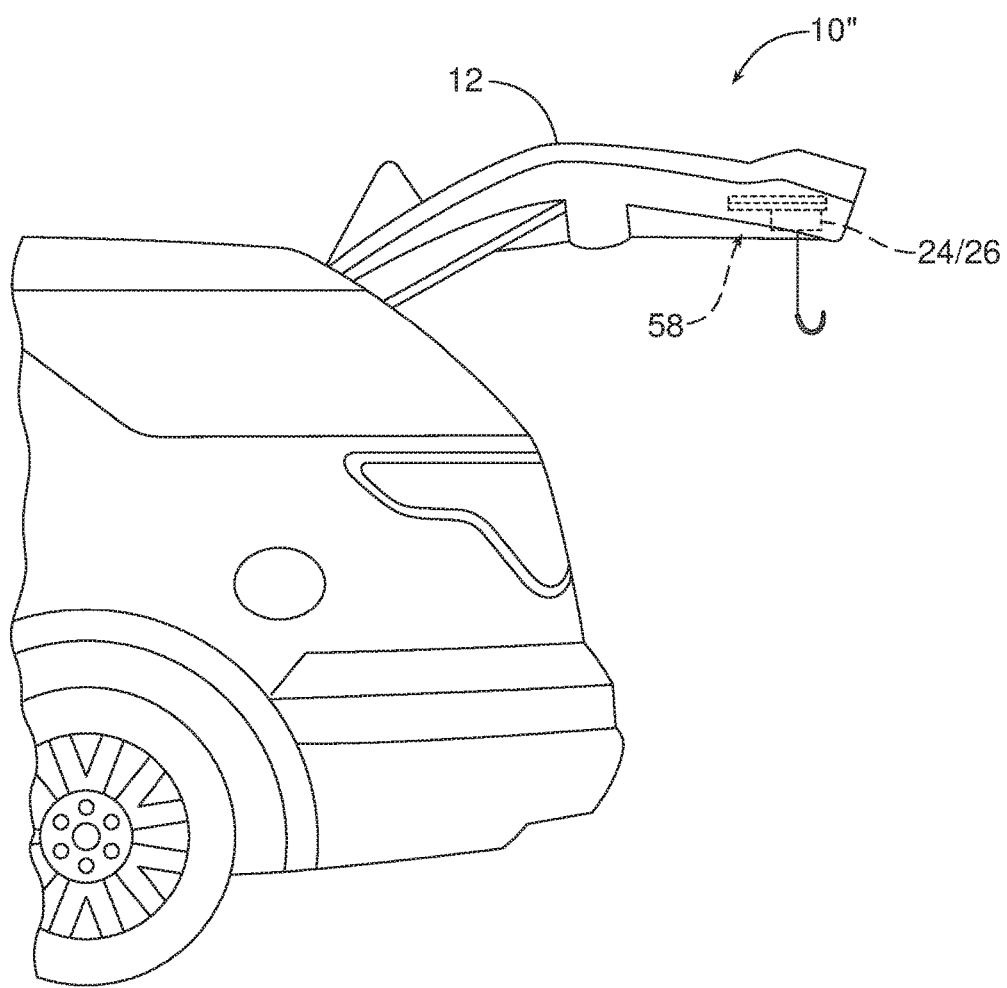
Figure 6B:
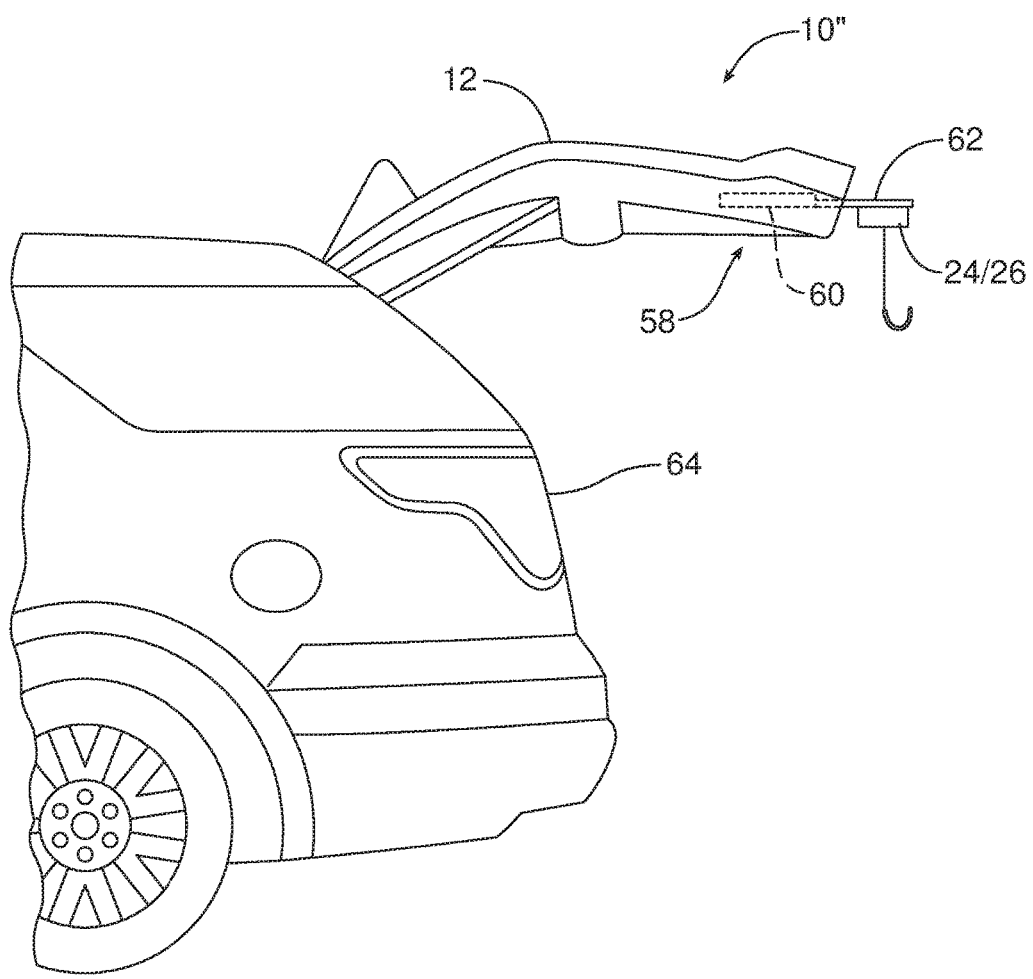

FIGS. 6a and 6b are schematic illustrations of yet another alternative embodiment of the apparatus incorporating an extendable support in the form of a telescoping rail system that allows the actuator of the apparatus to be displaced between a home position within the perimeter of the liftgate as illustrated in FIG. 6a and a deployed position projecting rearward from the perimeter of the liftgate as illustrated in FIG. 6b.

Reference will now be made in detail to the present preferred embodiments of the apparatus and method, examples of which are illustrated in the accompanying drawing figures.

DETAILED DESCRIPTION

Reference is now made to FIGS. 1a-1d and 2 which illustrate a first possible embodiment of the apparatus 10 for loading and unloading cargo 11 from a motor vehicle V. As illustrated in FIGS. 1a-1d, that cargo 11 comprises a folding bicycle which may be too heavy and unwieldy to be easily handled by an individual.

As illustrated in these drawing figures, the first embodiment of the apparatus 10 includes a liftgate 12 that is connected by means of hinges (not shown) to the motor vehicle V in a manner known in the art. A liftgate drive module 16 functions to displace the liftgate 12 between a closed position illustrated in FIG. 1a and a fully opened position illustrated in FIGS. 1b-1d. In the illustrated embodiment, the liftgate drive module 16 comprises a drive motor 18 and a controller 20.

The controller 20 may comprise a computing device such as a dedicated microprocessor or electronic control unit (ECU) operating in accordance with instructions from appropriate control software. Thus, the controller 20 may comprise one or more processors, one or more memories and one or more network interfaces all in communication with each other over a communication bus.

The apparatus 10 also includes a cargo receiver 22 that is carried on the liftgate 12 as well as an actuator 24 to raise and lower cargo 11 with respect to the cargo receiver 22. The actuator 24 is carried on the liftgate 12.

In the embodiment illustrated in FIGS. 3a-3d, the actuator 24 comprises a winch 26 including a line 28, a line reel 30, a drive motor 32 and a hook 34 for connecting to the cargo 11. As is known in the art, the drive motor 32 drives the line reel 30 to pay the line 28 in or out.

As best illustrated in FIGS. 3a-3d, the cargo receiver 22 comprises a hollow body that is connected to the liftgate 12 by a pivot 36. In the illustrated embodiment, the pivot 36 comprises a pivot pin 38 that is received in an elongated guide 40 on the liftgate 12. As should be appreciated, the pivot pin 38 is displaceable along the guide 40 as the cargo receiver 22 is displaced between the first or cargo storing position illustrated in FIG. 3d and the second or cargo deploying position illustrated in FIGS. 3a-3c. As should be appreciated, the line 28 of the winch 26 extends over a pulley 42 down through the hollow body of the cargo receiver 22.

Figure 1A:
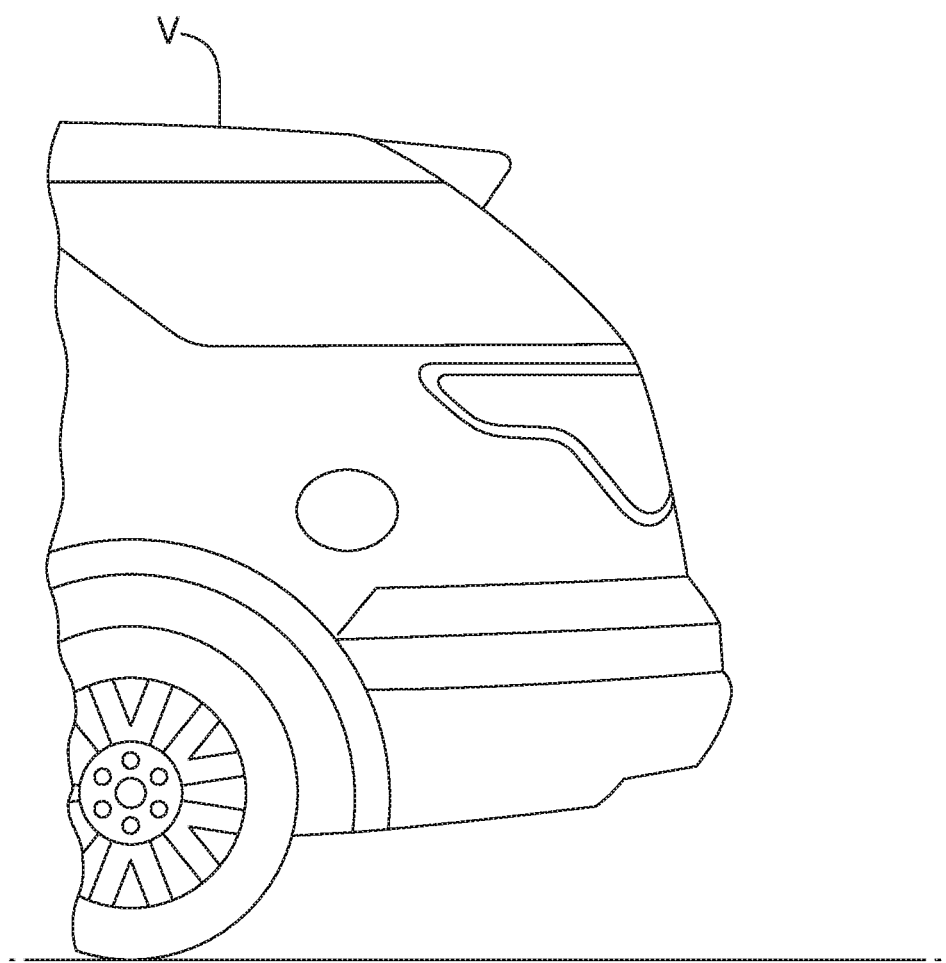
FIGS. 1a-1d are a series of schematic illustrations showing the deployment of cargo in the form of a folding bicycle, from a motor vehicle utilizing the new and improved apparatus and method.
Figure 1B:
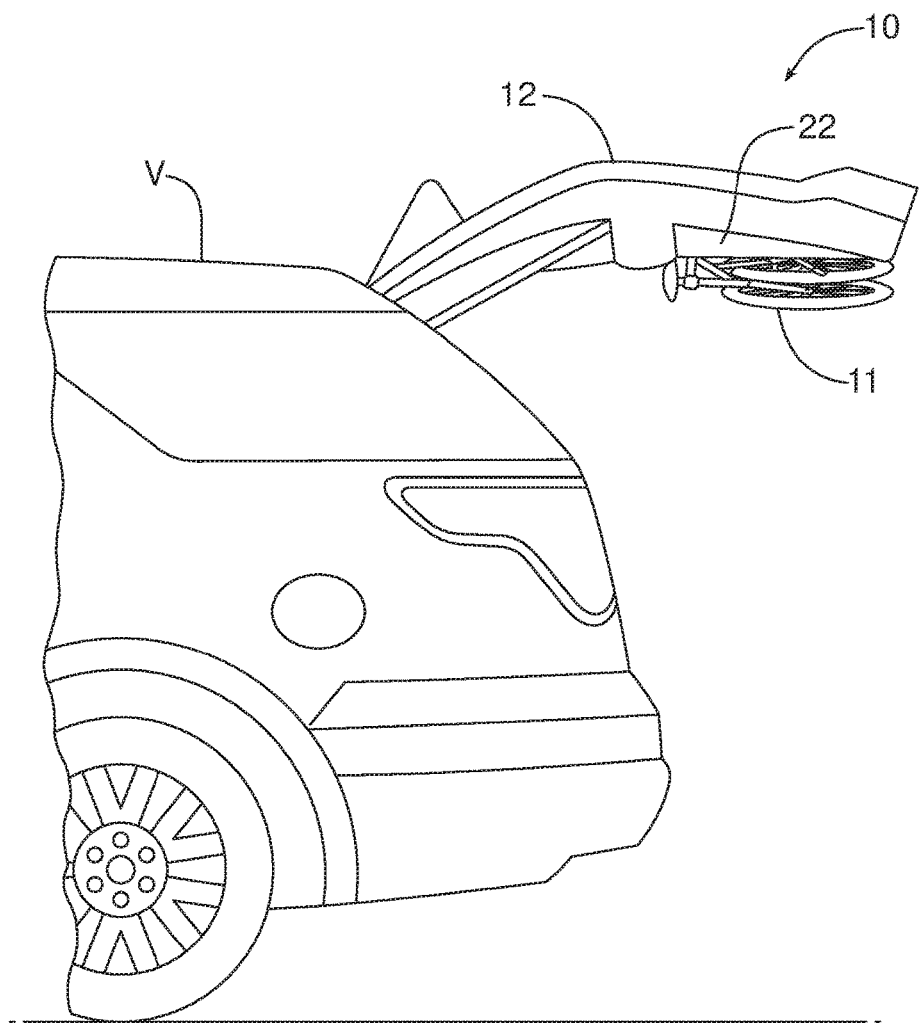
Figure 1C:
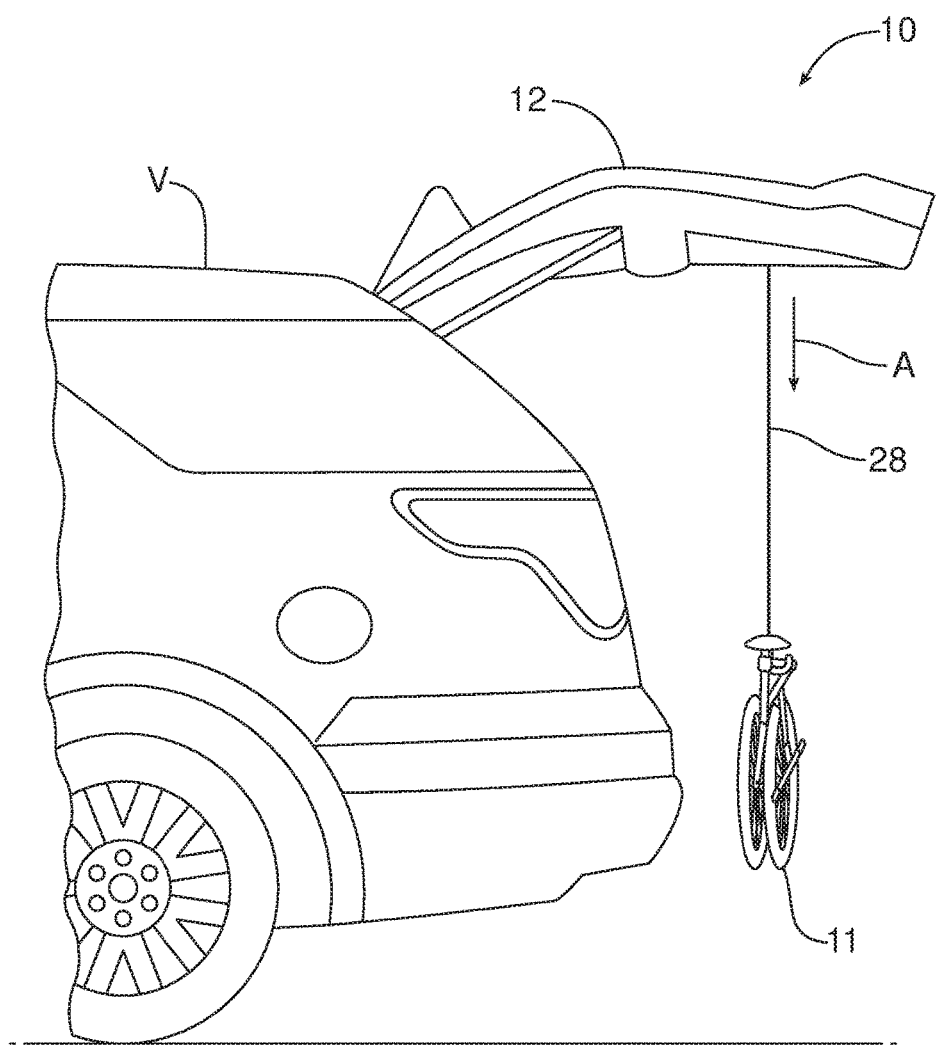
Figure 1D:
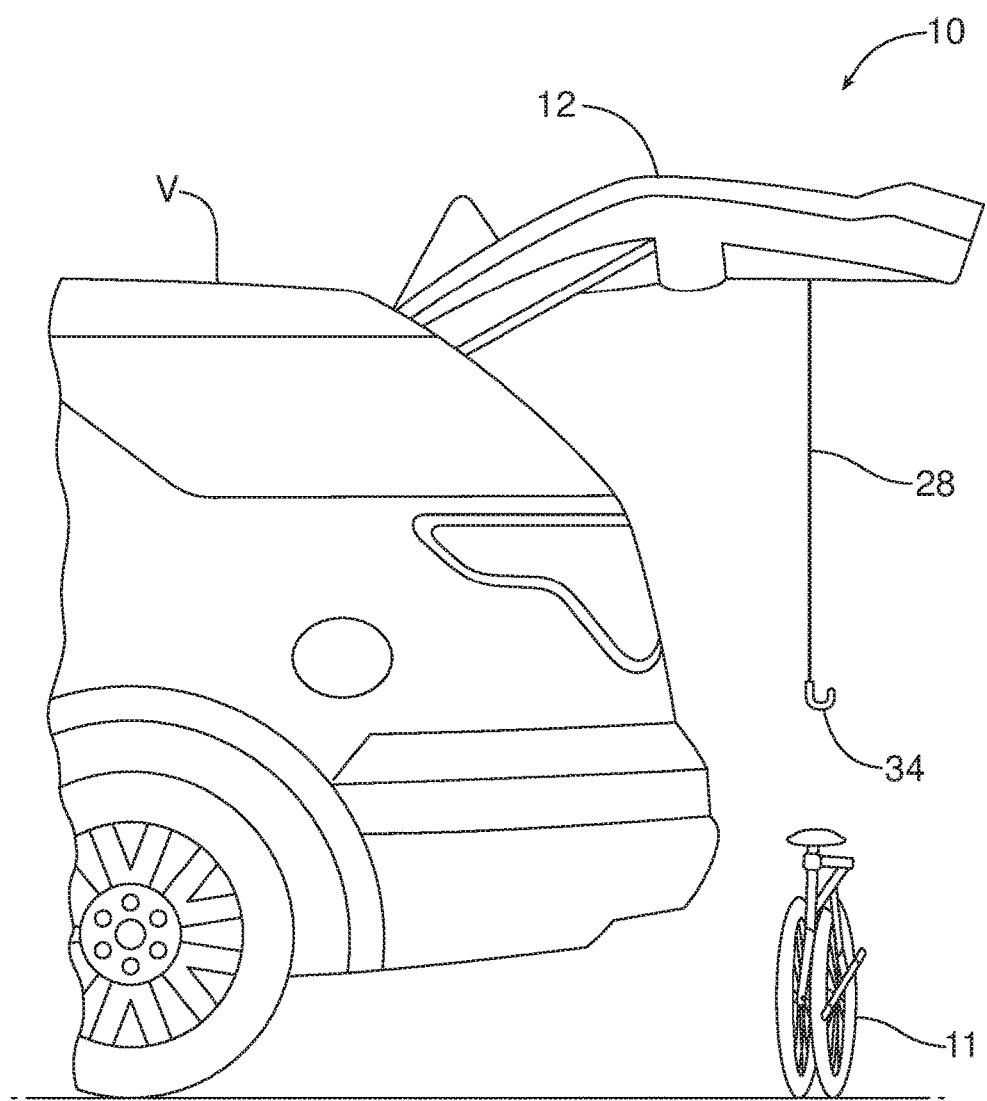
Figure 2:
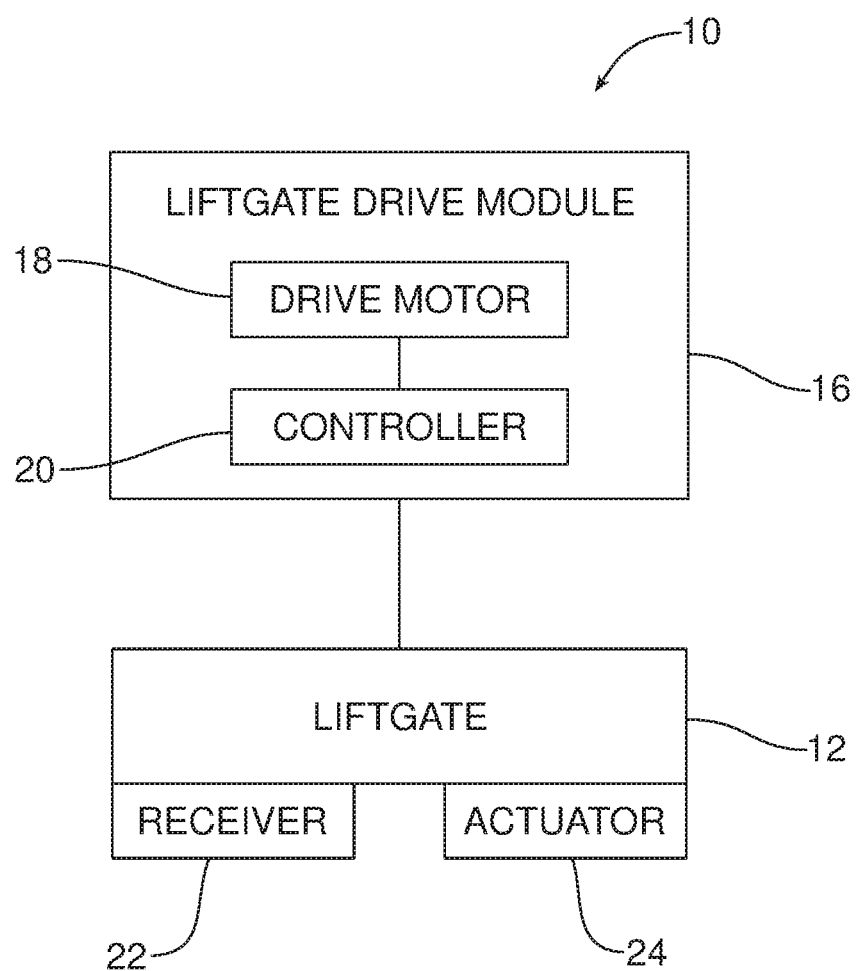
FIG. 2 is a schematic block diagram of a first possible embodiment of the apparatus.
Figure 3A:
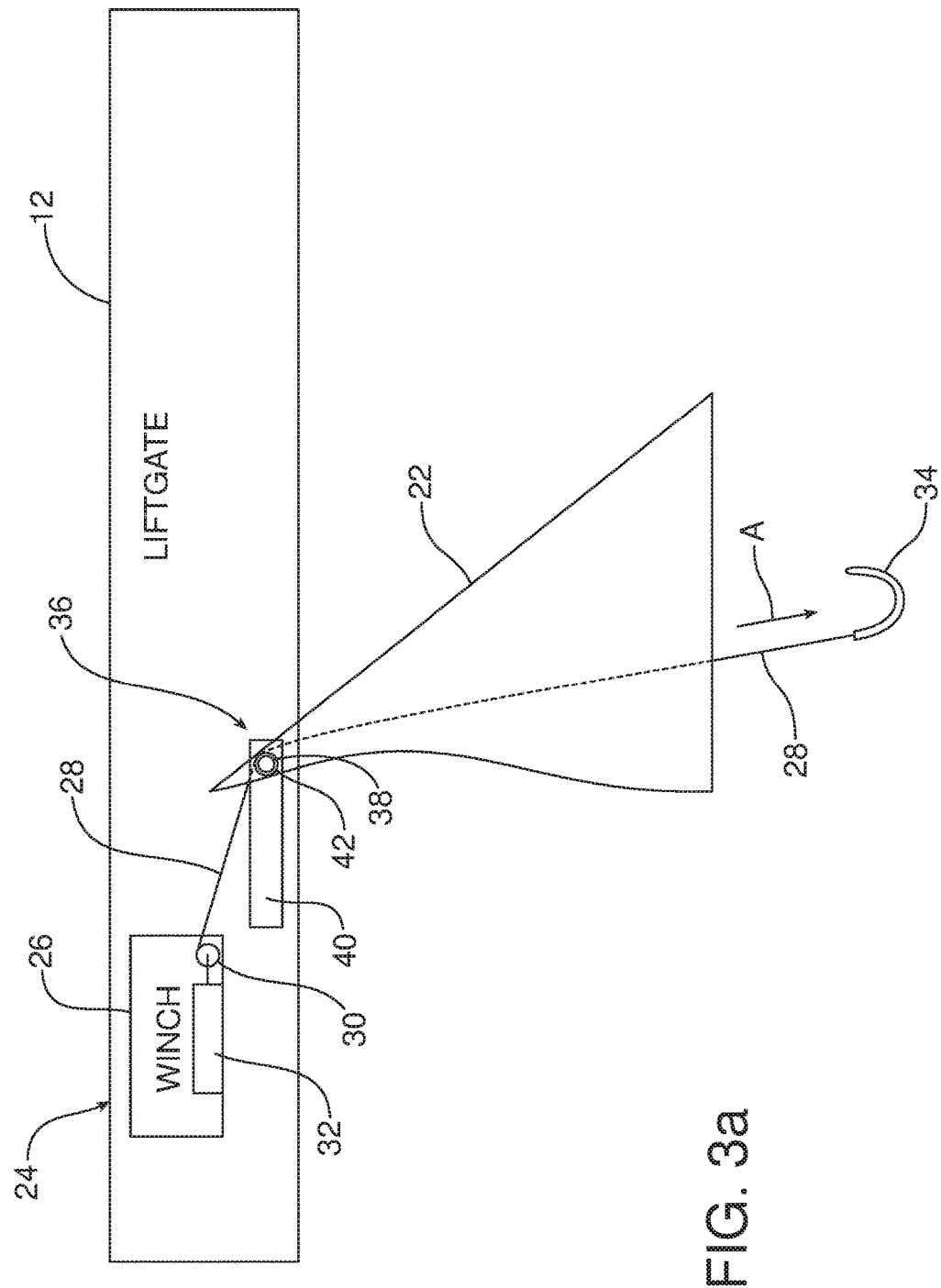
FIGS. 3a-3d are a series of schematic illustrations showing one possible embodiment of cargo receiver that may be utilized with the apparatus.
Figure 3B:
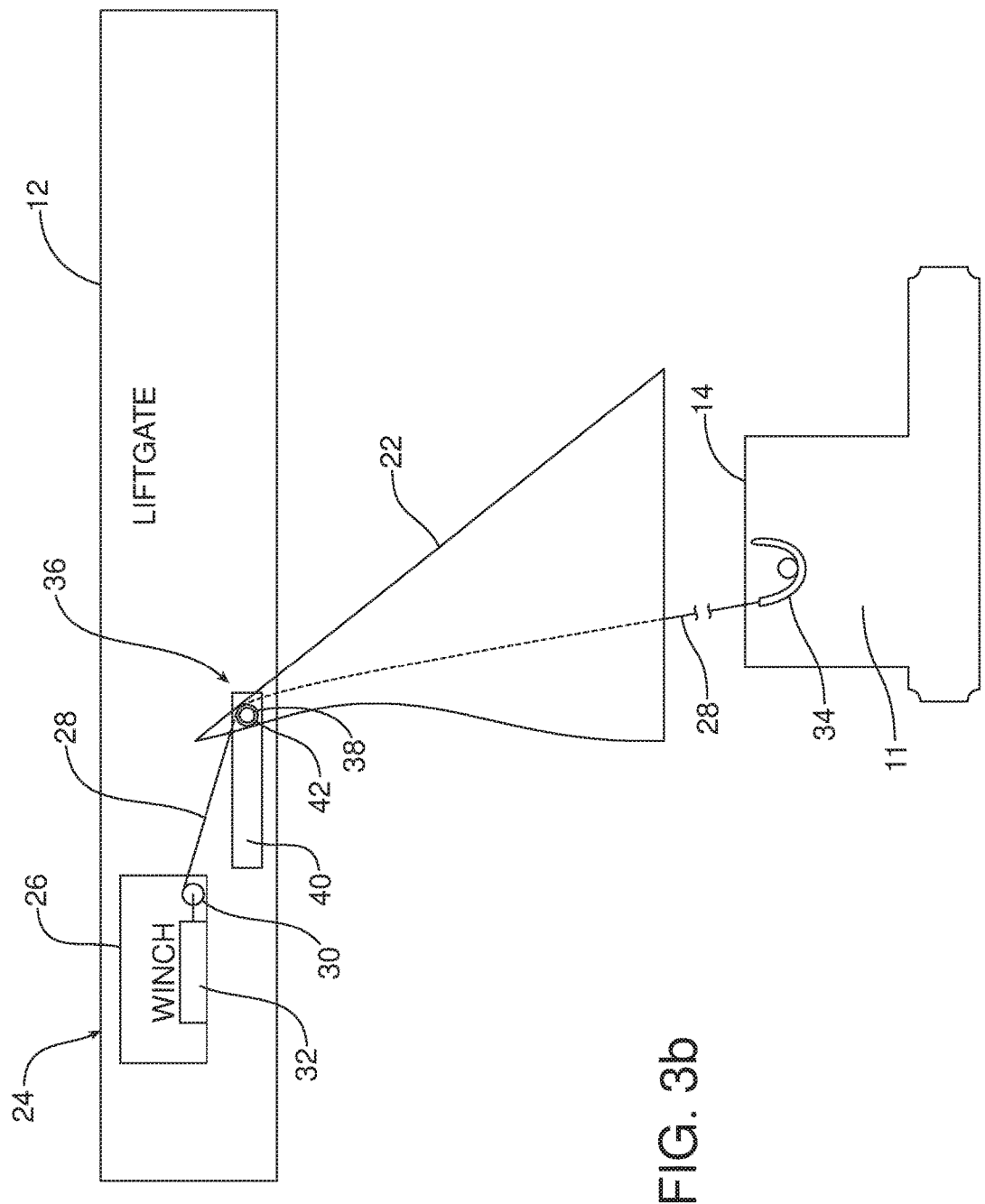
Figure 3C:
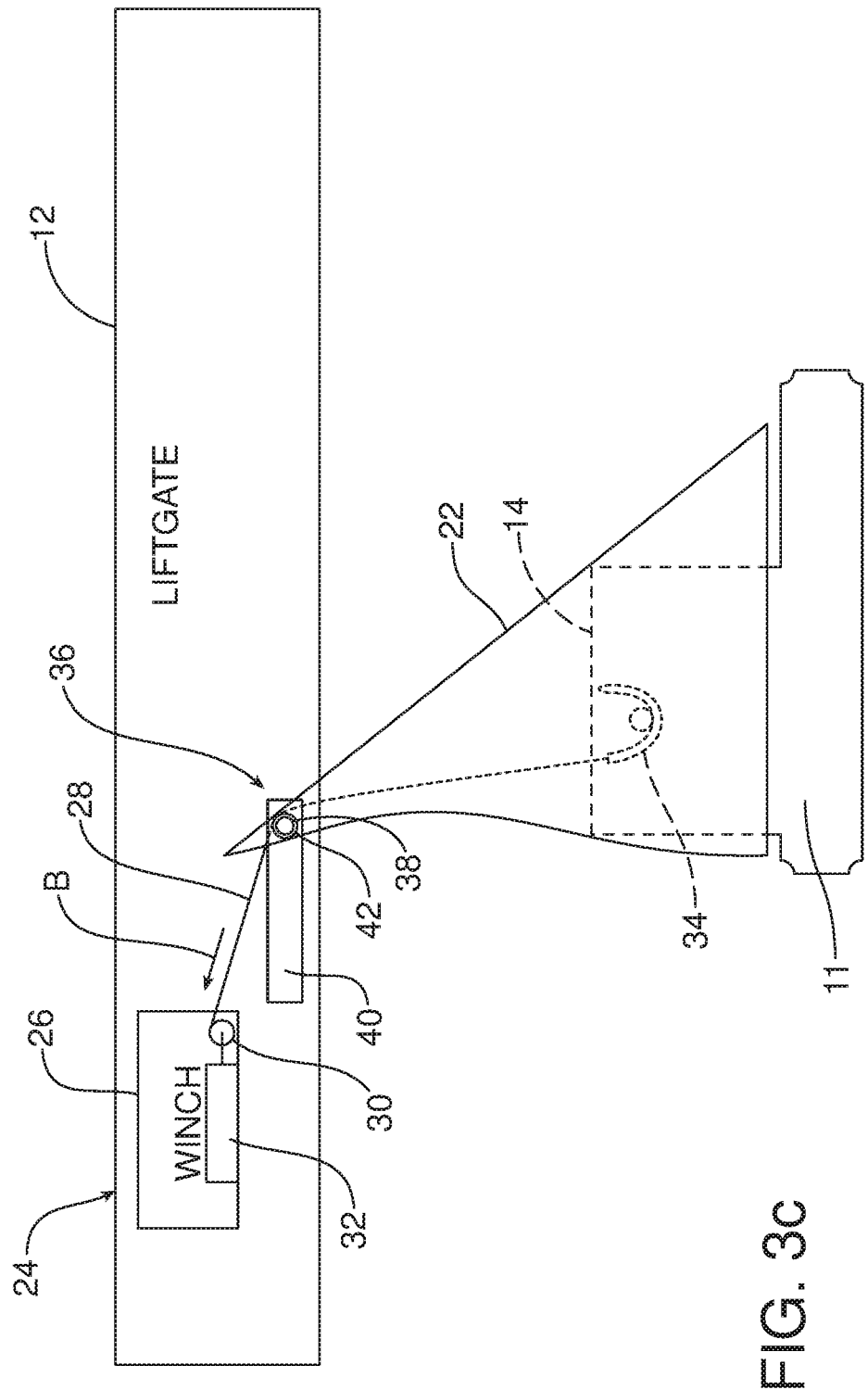
Figure 3D:
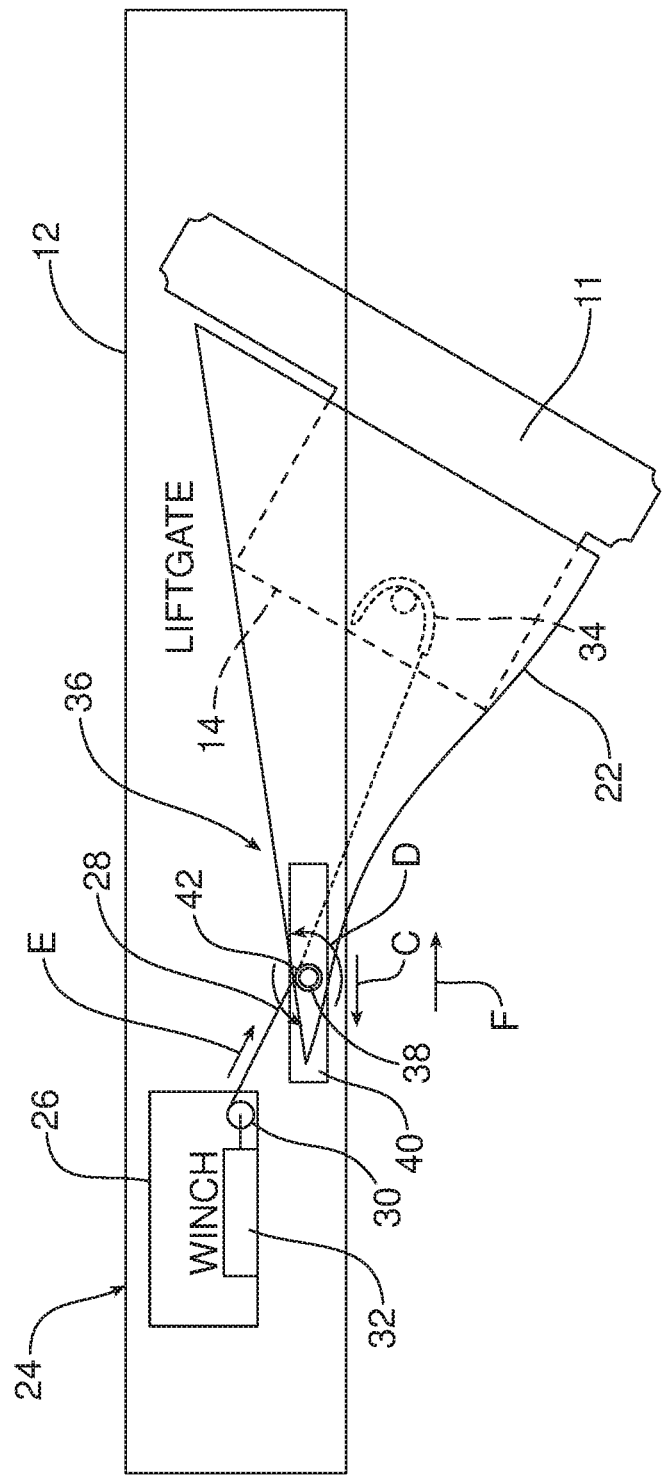
Figure 4:
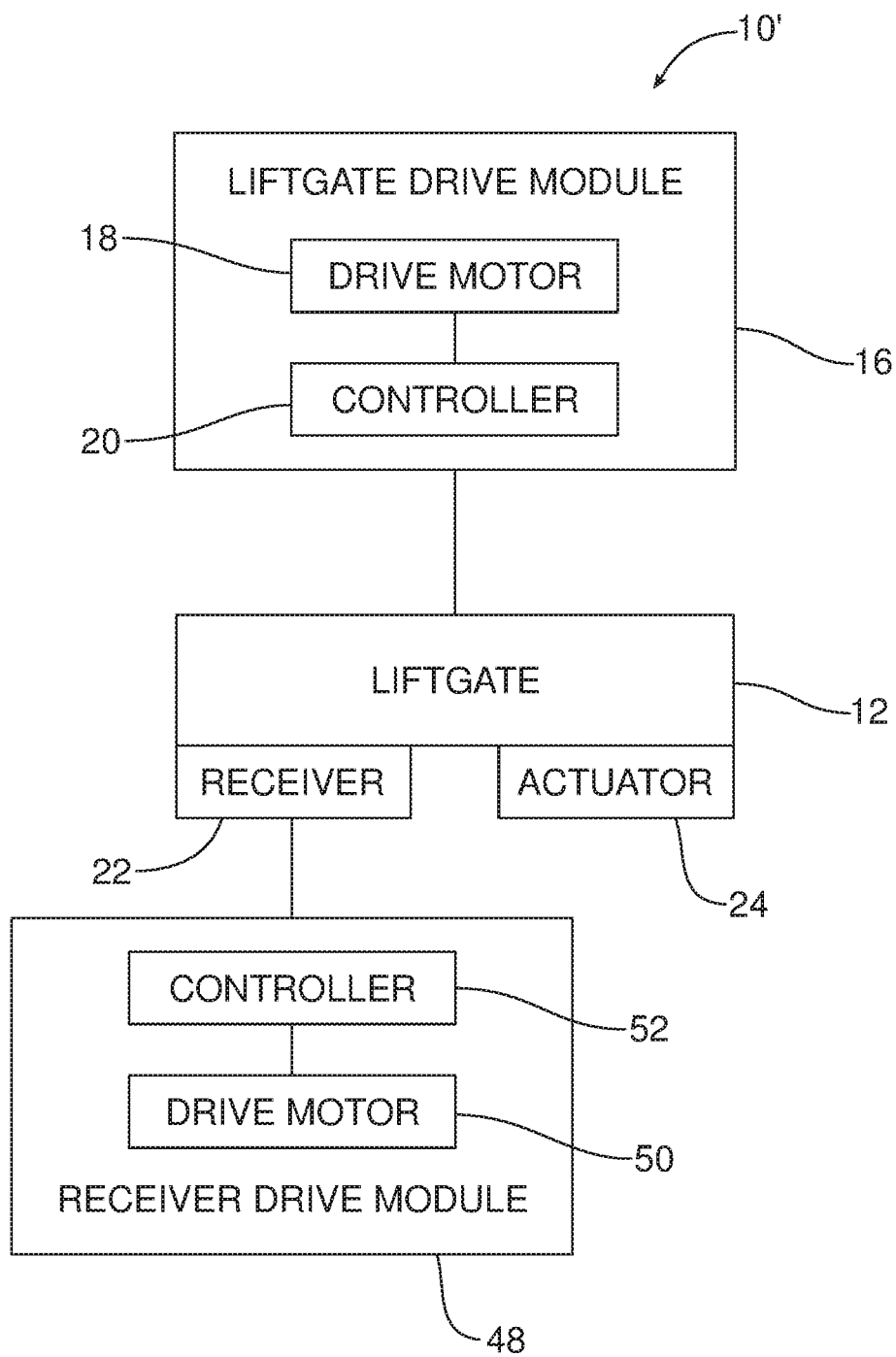
FIG. 4 is a schematic block diagram of a second possible embodiment of the apparatus.

The apparatus 10 illustrated in FIGS. 3a-3d may be utilized in a method of loading cargo 11 into a motor vehicle V. More specifically, that method includes the step of paying out the line 28 with the winch 26 in the direction of action arrow A and then connecting the line to the cargo 11 utilizing the hook 34 (see FIGS. 3a and 3b). This is then followed by the step of raising, by the actuator 24/winch 26, the cargo 11. This is done by winding the line 28 on the line reel 30 so that the line is drawn into the cargo receiver in the direction of action arrow B. As this is done, the portion 14 of the cargo 11 is drawn within the hollow body of the cargo receiver 22 (see FIG. 3c). As the drive motor 32 of the winch 26 continues to wind the line 28 on the line reel 30, the pivot pin 38 of the cargo receiver 22 is drawn along the guide 40 in the direction of action arrow C ultimately causing the cargo receiver 22 to pivot about the pivot pin in the direction of action arrow D from the second position or orientation illustrated in FIGS. 3a-3c to the first position or orientation illustrated in FIG. 3d. Here it should be appreciated that the cargo receiver 22 may be pivoted to an arc of anywhere of between, for example, 45 degrees and 100 degrees. Ultimately, the cargo receiver 22 and the cargo 11 may be at least partially pivoted into an internal cavity in the liftgate 12 as illustrated in FIG. 3d. Once the cargo 11 is held in the cargo receiver 22 in the first or cargo retaining position illustrated in FIG. 3d, the liftgate drive module 16 may be activated to close the liftgate 12 such as illustrated for the previous embodiment by FIGS. 1b and 1a. As should be appreciated, the actuator 24/winch 26 of the apparatus 10 lifts the cargo 11 and holds the cargo in the cargo receiver 22. The liftgate drive module 16 then closes the liftgate 12 and pivots the cargo receiver 22 and cargo 11 into the storage area at the rear of the motor vehicle V. Thus, all lifting and handling of the cargo 11 during the cargo loading process is performed by the apparatus 10 in a convenient and effective manner while limiting cargo handling requirements of the individual operator.

When one wishes to unload the cargo 11 from the motor vehicle V, the steps are performed in reverse. Thus, initially the operator activates the liftgate drive module 16 to displace the liftgate 12 from the closed position to the open position. As the liftgate 12 is pivoted open by the liftgate drive module 16, the cargo receiver 22 and cargo 11 are pivoted into a deployment position with the cargo held in the cargo receiver 22 as illustrated in detail in FIG. 3d. The actuator 24 is then utilized to lower the cargo from the cargo receiver 22. More specifically, in the illustrated embodiment, the actuator 24/winch 26 is activated so that the drive motor 32 pays out line 28 from the line reel 30 in the direction of action arrow E. As this is done, the pivot pin 38 slides in the direction of action arrow F along the guide 40 and the cargo receiver 22 pivots in the direction of action arrow G about the pivot pin 38 thereby being displaced from the first orientation or cargo storing position illustrated in FIG. 3d to the second orientation or cargo deploying position illustrated in FIG. 3c. As the drive motor 32 continues to pay out the line 28 from the line reel 30, the cargo 11 is lowered from the cargo receiver 22 until the cargo is resting upon the ground. The hook 34 is then disconnected from the cargo and the drive motor 32 of the winch is activated to rewind the line 28 on the line reel 30 until the cargo receiver is once again pivoted back into the first orientation or cargo storing position. At that time the drive motor 32 is deactivated and the liftgate drive module is activated to displace the liftgate 12 about the hinges from the opened position to the closed position.

Reference is now made to FIGS. 4 and 5a-5e which illustrate an alternative embodiment of the apparatus 10'. Like reference numbers identify like components of the apparatus 10'. Thus, the apparatus 10' includes a liftgate 12, connected by a hinge to the motor vehicle V. Further, the apparatus 10' includes a liftgate drive module 16 for displacing the liftgate 12 between the open and closed positions. That liftgate drive module 16 includes a drive motor 18 and a controller 20. A cargo receiver 22 is carried on the liftgate 12. In contrast to the cargo receiver 22 of the embodiment of the apparatus 10 illustrated in FIGS. 3a-3d, the cargo receiver 22 of the embodiment illustrated in FIGS. 5a-5 includes an integral gear set 44 in addition to a hollow body 46. In addition, the embodiment of the apparatus 10' also includes an actuator 24 in the form of a winch 26 having a line 28, a line reel 30 and a drive motor 32 as well as a hook 34.

In contrast to the embodiment of the apparatus 10 illustrated in FIGS. 3a-3d, the embodiment of the apparatus 10' illustrated in FIGS. 4 and 5a-5e includes a receiver drive module 48 including a drive motor 50 and a controller 52. The controller 52 may comprise a computing device such as a dedicated microprocessor or electronic control unit (ECU) operating in accordance with instructions received from appropriate control software. As will be explained in greater detail below, the receiver drive module 48 functions to displace the cargo receiver 22 between a first orientation or cargo storing position illustrated in FIG. 5e and a second orientation or cargo deploying position illustrated in FIGS. 5a-5c.

Figure 5A:
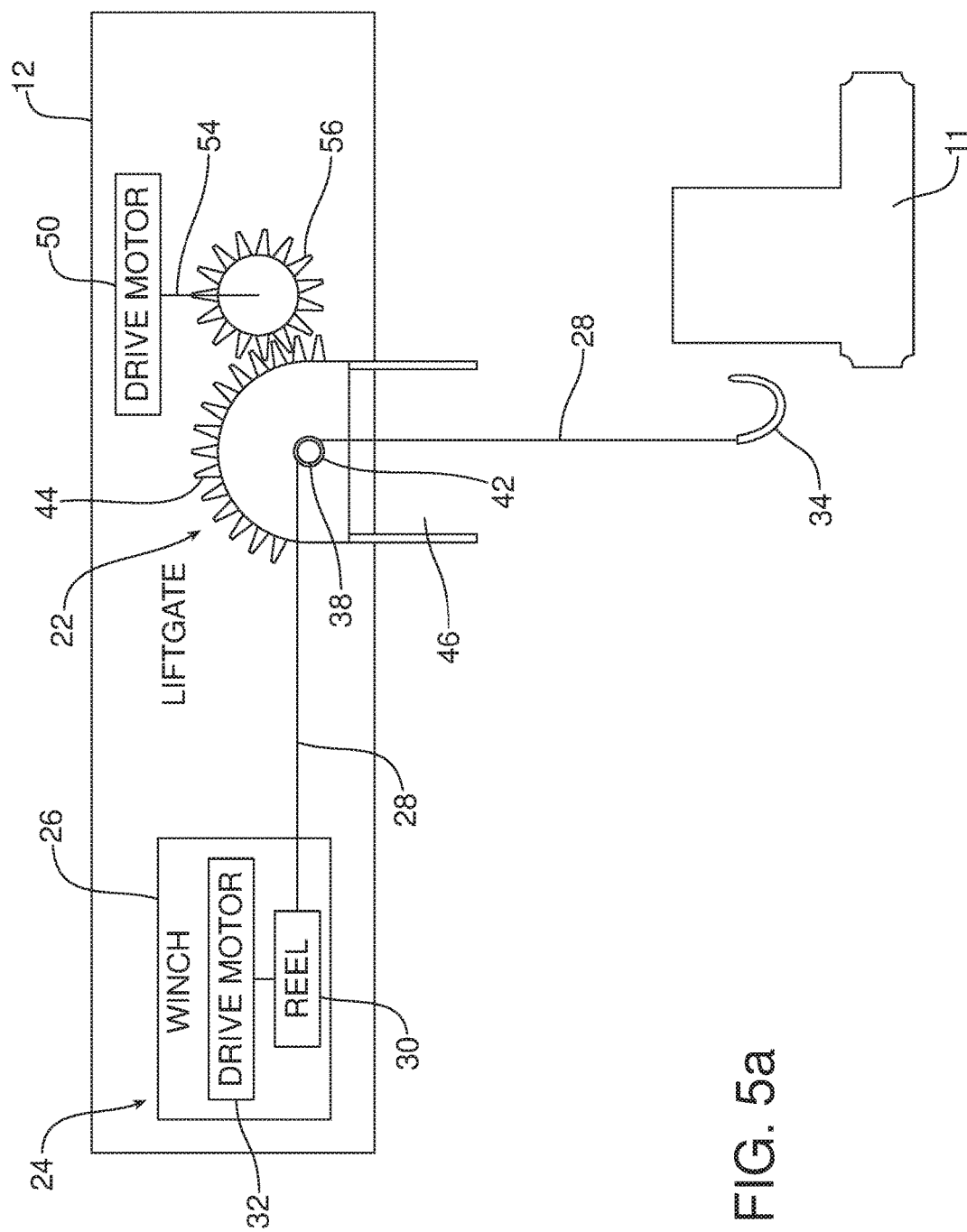
FIGS. 5a-5e are a series of schematic illustrations showing a second possible embodiment of a receiver that may be utilized with the apparatus illustrated in FIG. 4.
Figure 5B:
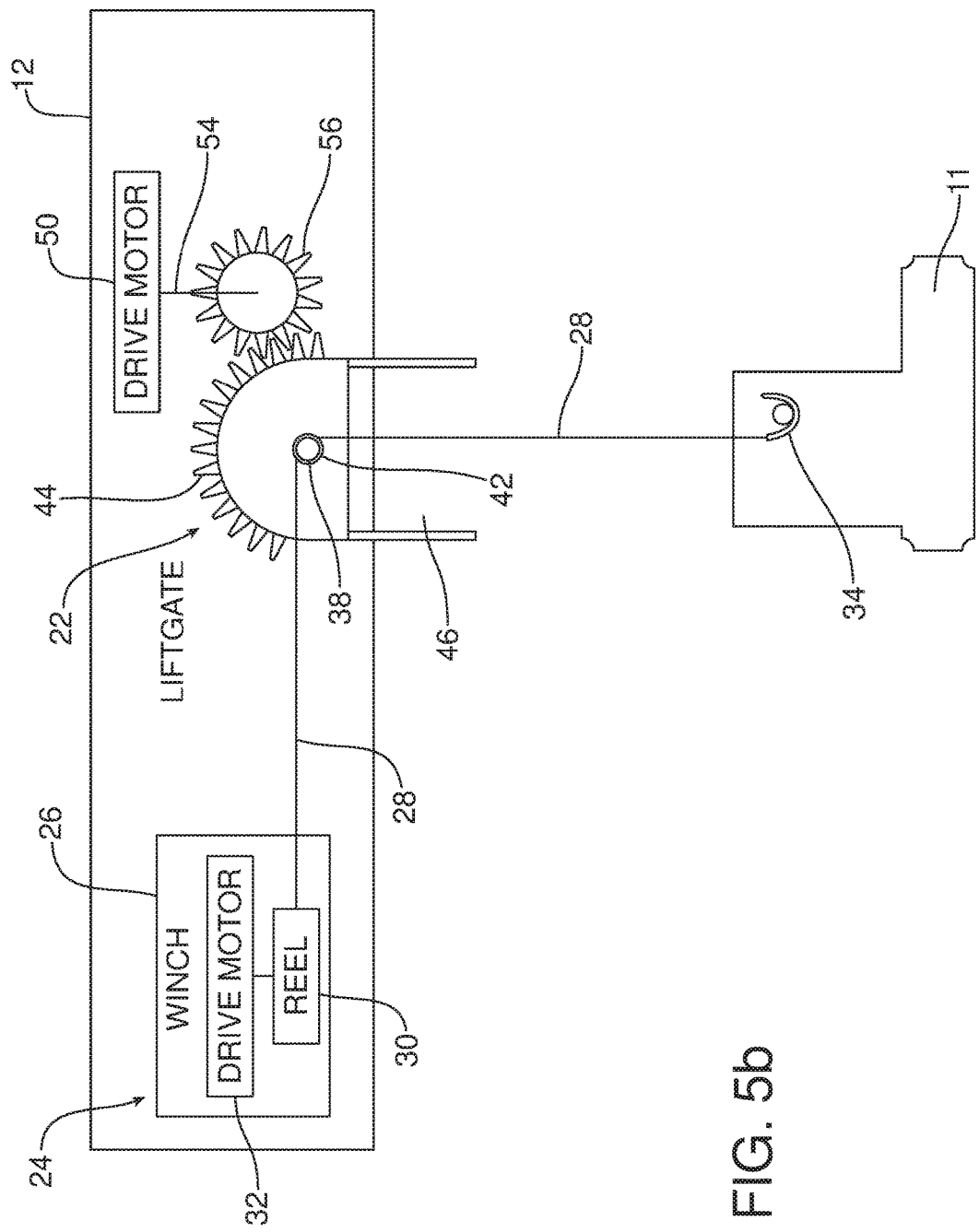
Figure 5C:
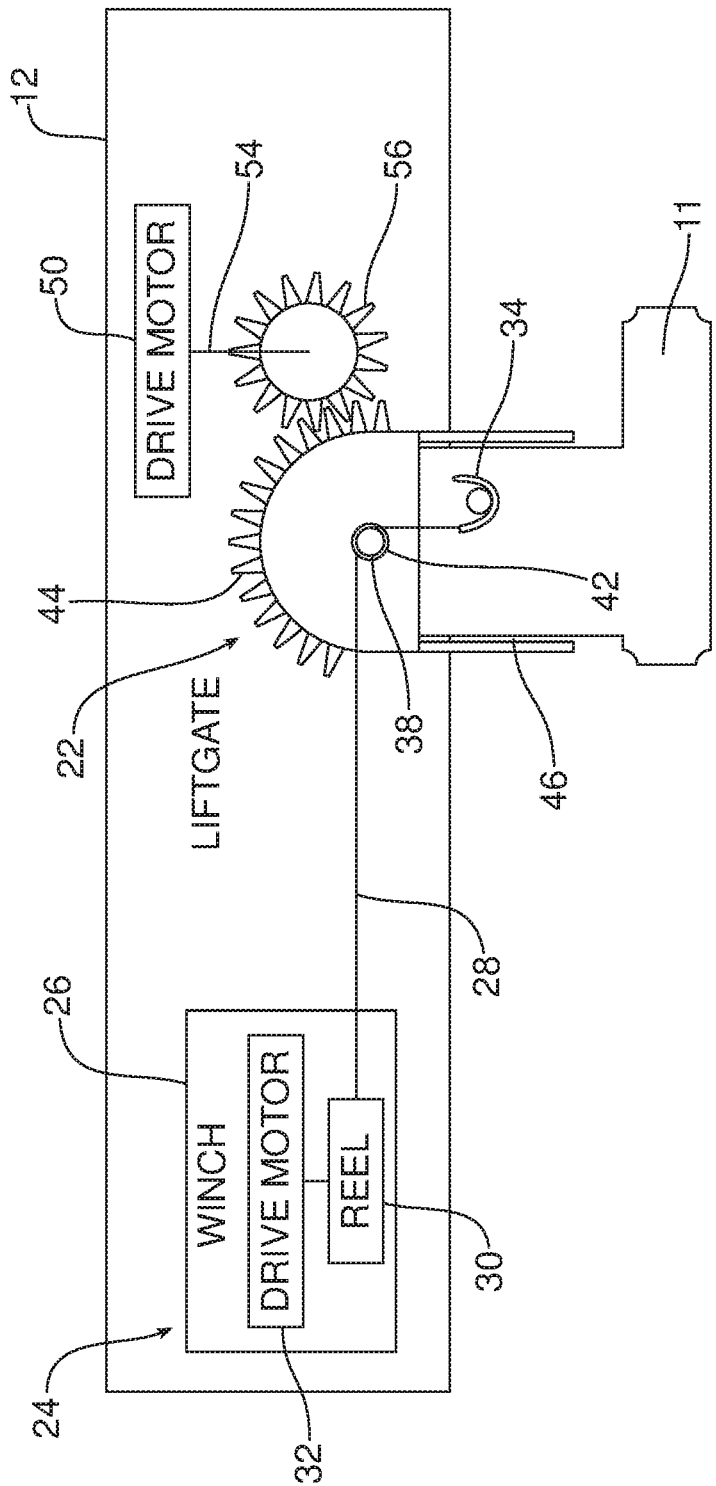
Figure 5D:
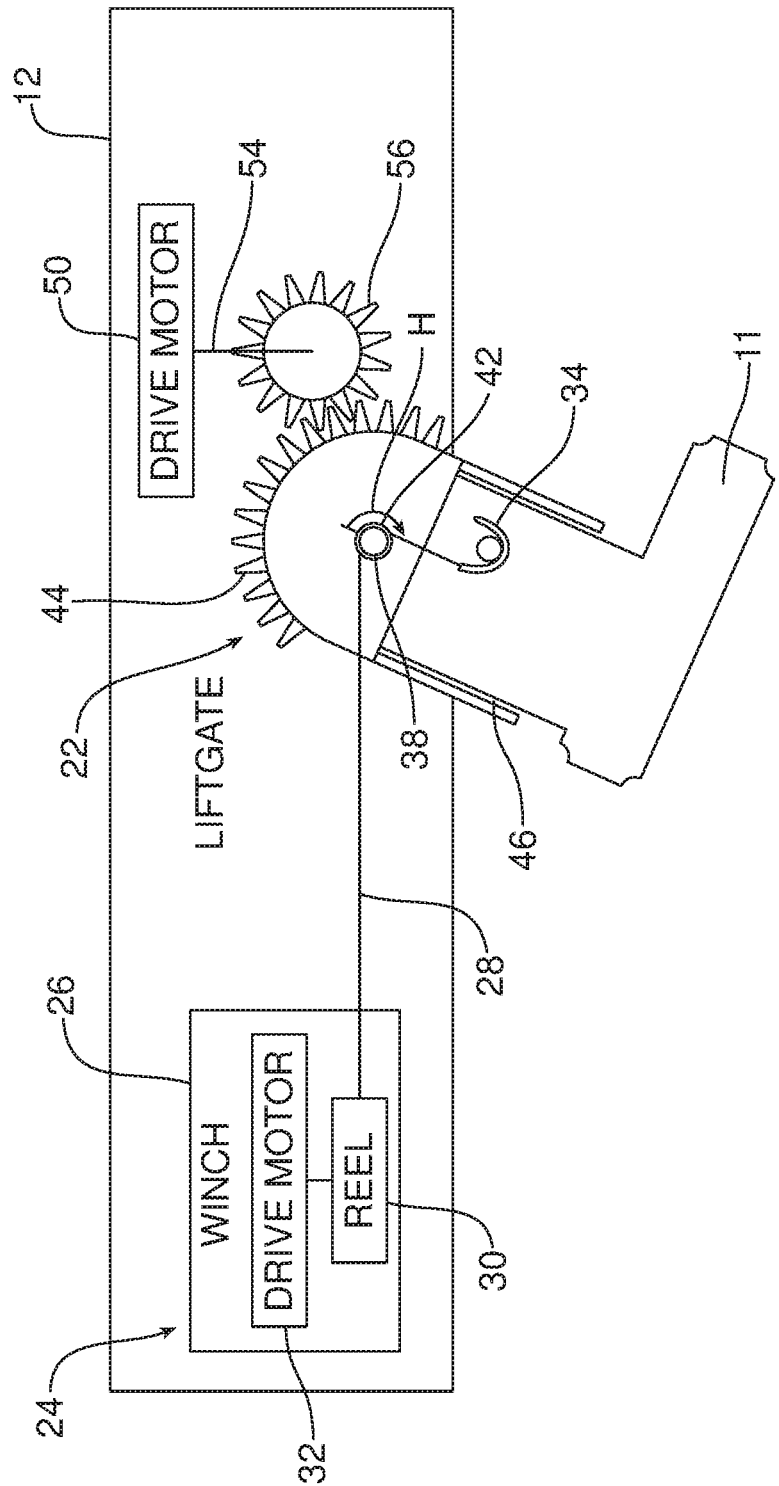

When one wishes to load cargo 11 into the motor vehicle V, the liftgate 12 is displaced about the hinges into the opened position. The actuator 24/winch 26 is then utilized to pay out line 28 until there is enough slack in the line to allow the hook 34 to be connected to the cargo 11 (see FIGS. 5a and 5b). At this point, the actuator 24/winch 26 is activated and the drive motor 32 causes the line 28 to be wound upon the line reel 30. That line 28 extends through the cargo receiver 22 so that the portion 14 of the cargo 11 is drawn into the hollow body 46 of the cargo receiver 22 as illustrated in FIG. 5c. At this point, the actuator 24/winch 26 is deactivated.

Now, the drive motor 50 of the receiver drive module 48 is activated. That drive motor 50 includes a drive shaft 54 connected to the drive gear 56 that is engaged with the gear set 44 of the cargo receiver 22. As should be appreciated, the receiver drive module 48 functions to pivot the cargo receiver 22 about the pivot pin 38 in the direction of action arrow H from the second orientation illustrated in FIG. 5c into the first orientation or cargo storing position illustrated in FIG. 5e. As this is done, slack is provided in the line 28 by paying out line from the line reel 30.

Figure 5E:
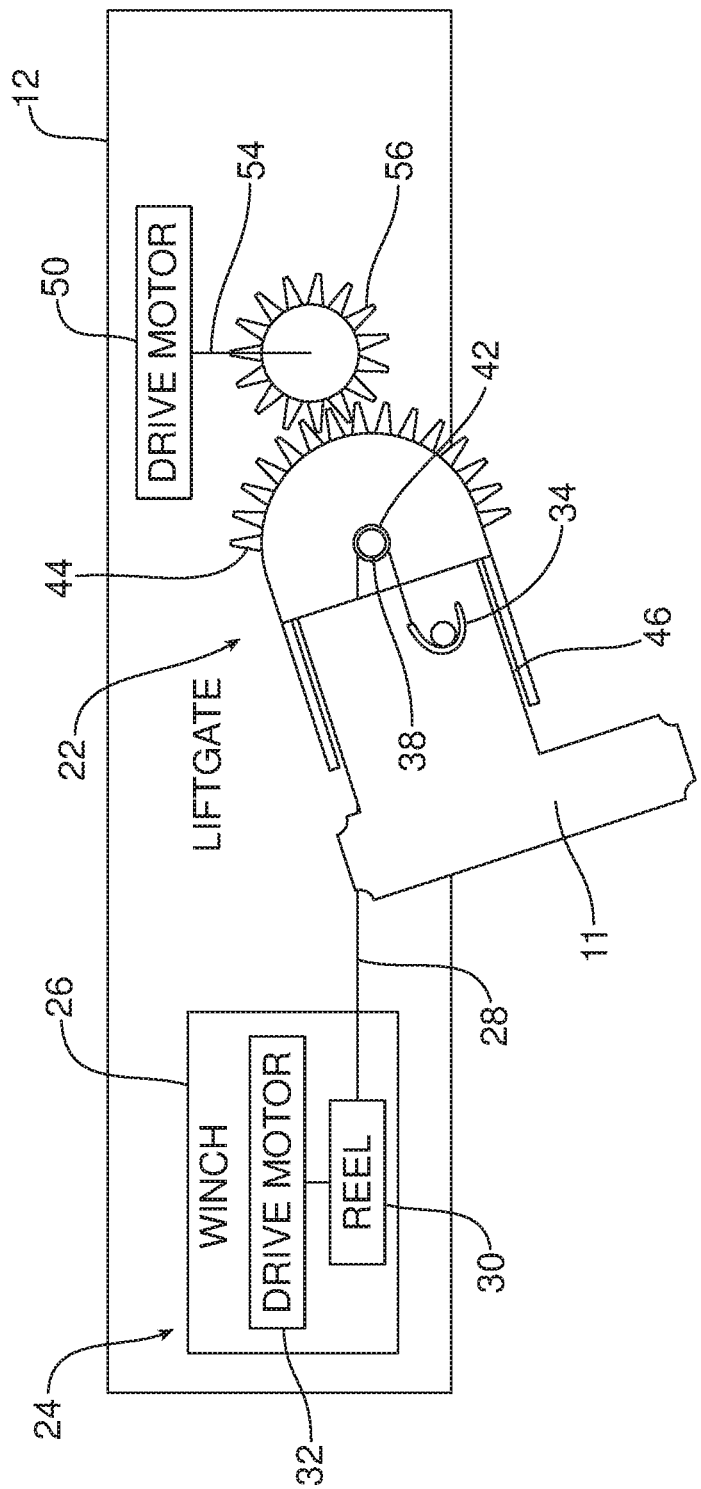

Once the cargo receiver 22 has been fully pivoted into the cargo storing position illustrated in FIG. 5e, it is locked in place in that position by the drive motor 50 of the receiver drive module 48. Similarly, the drive motor 32 of the winch 26 takes up any slack and locks the line reel 30 so that the cargo 11 is held in the hollow body 46 of the cargo receiver 22 as the liftgate drive module 16 is activated to close the liftgate 12 and pivot the cargo into the cargo area of the motor vehicle V.

When one wishes to deploy the cargo 11 the steps are performed in the opposite order. As should be appreciated, all lifting during the loading and unloading of the cargo 11 is done by the apparatus 10 thereby relieving that physical burden from the operator of the apparatus.

Reference is now made to FIGS. 6a and 6b illustrating yet another alternative embodiment of the apparatus 10". As illustrated, the apparatus 10" includes an extendable support 58 connecting the actuator 24/winch 26 to the liftgate 12. This extendable support 58 allows the actuator 24/winch 26 to be displaced between a home position illustrated in FIG. 6a wherein the actuator/winch is held within a cavity in the liftgate 12 and a deployed position illustrated in FIG. 6b wherein the actuator 24/winch 26 projects from the liftgate in a rearward direction with respect to the motor vehicle V. In the illustrated embodiment, the extendable support comprises a telescoping rail system including a first rail 60 and a second rail 62.

When the actuator 24/winch 26 is displaced into the deployed position, additional clearance is provided between the actuator/winch and the rear 64 on the motor vehicle V thereby allowing more room for handling bulkier, larger cargo.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus, comprising:
a liftgate;
a liftgate drive module to displace said liftgate between a closed position and an opened position;
a cargo receiver carried on said liftgate, said cargo receiver having a hollow body; and
an actuator to raise and lower cargo with respect to said cargo receiver, said actuator including a winch having a line, a line reel, a first drive motor and a hook connected to said line wherein said cargo receiver is connected to said liftgate by a pivot and said cargo receiver is displaceable between a cargo storing position and a cargo deploying position and wherein said line extends through said cargo receiver.

2. The apparatus of claim 1, wherein said pivot is a pivot pin and said liftgate includes a guide, said pivot pin displaceable along said guide as said cargo receiver is displaced between said cargo storing position and said cargo deploying position.

3. The apparatus of claim 1, further including a receiver drive module to displace said cargo receiver between said cargo storing position and said cargo deploying position.

4. The apparatus of claim 3, wherein said liftgate drive module includes a second drive motor and a first controller.

5. The apparatus of claim 4, wherein said receiver drive module includes a third drive motor and a second controller.

6. The apparatus of claim 1, further including an extendable support connecting said actuator to said liftgate whereby said actuator may be displaced between a home position and a deployed position.

7. The apparatus of claim 6, wherein said extendable support comprises a telescoping rail system.

* * * * *